Figure 1:
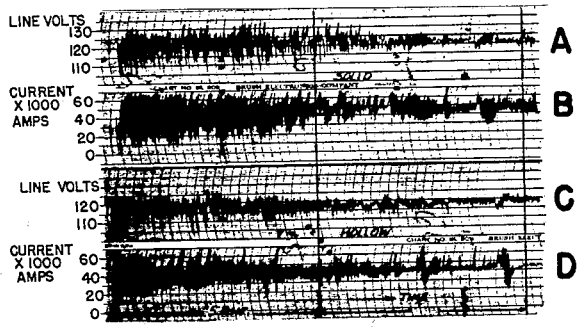
Figure 1:
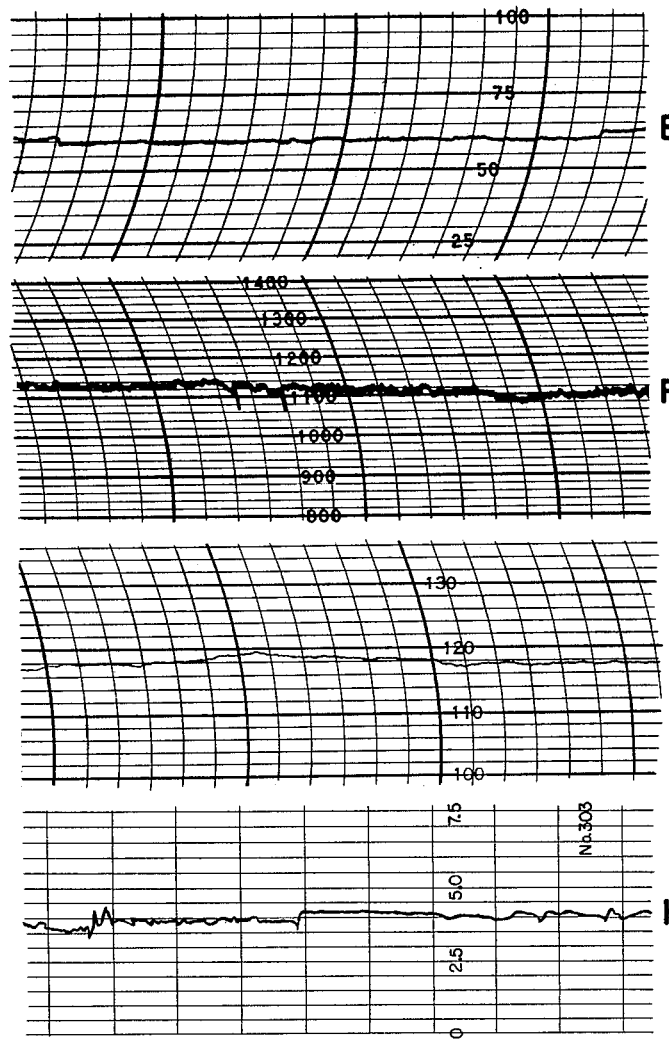

Sept. 1, 1964  R. M. GAGE  3,147,330

METHOD FOR FURNACING CONDUCTIVE MATERIALS

Filed Sept. 24, 1962  3 Sheets-Sheet 1

INVENTOR.
ROBERT M. GAGE
BY Leo A. Plum, Jr.
ATTORNEY.

United States Patent Office 3,147,330
Patented Sept. 1, 1964

3,147,330
METHOD FOR FURNACING CONDUCTIVE MATERIALS
Robert M. Gage, Summit, N.J., assignor to Union Carbide Corporation, a corporation of New York
Filed Sept. 24, 1962, Ser. No. 225,793
20 Claims. (Cl. 13—9)

The present invention relates to a novel method for furnacing conductive materials. More specifically, the present invention relates to novel processes for melting and refining metals in furnaces with directionally stable and directionally controllable electric arcs wherein the heat energy available from dissipation of electrical energy from a given power supply is fully and closely controlled by manipulation of arc length and/or gas composition both in the furnace atmosphere and in the arc column itself.

Meltdown in standard electric furnace practice requires as high a melting rate as possible. An electric furnace can be analogized to a leaking heat sink containing metal into which heat energy is being poured. If only an amount of heat energy is introduced into the heat sink at a rate equal to the rate of heat loss from the sink, of course, no melting occurs. As the rate of heat input is increased to levels greater than the rate of heat loss, the metal will increase in temperature and eventually reach a temperature near the melting point of the metal. At this point, if the rate of heat input is maintained, the metal will continue to adsorb heat energy in sufficient amounts to supply the latent heat of fusion without changing temperature and the metal will melt. Superheating of the molten metal then requires further heat energy. This simple explanation of melting per se must be viewed in light of the fact that as the temperature in the heat sink increases heat losses by leakage from the heat sink also increase considerably. Because of the inherent inability of electric furnaces to act as leak-proof heat reservoirs it is readily apparent that heat economy can only be increased by increasing the melting rate. Time is an important element since total heat loss increases with time, and indeed, as high temperatures are reached in the furnace, total heat loss drastically increases with time.

Accordingly, any attempt to increase melting rate requires a constant high intensity heat source. The heat source in a standard electric furnace is an open electric arc. The open electric arc in standard electric furnacing practice has been found to be a convenient and practical means for converting electrical energy into heat energy in the furnace but an open electric arc as presently used in standard electric arc furnaces is not a constant source of high intensity heat energy. It is an intermittent high intensity source of heat energy. An open electric arc running in an air atmosphere or any not completely inert atmosphere in an electric furnace filled with large pieces of scrap is extremely erratic and virtually uncontrollable in length and direction. The erratic behavior of an open arc causes production of considerable metal "smoke," damages refractories by high radiation loss and actually arcs to the side walls of the furnace, is positionally influenced by scrap movement, stray magnetic fields, air currents in the furnace, metal vapors or other contaminating vapors in the furnace and also by the presence of other arcs in the furnace itself.

An electric arc column is in essence a flexible conductor of non-linear resistance. Its resistance is dependent primarily upon its length and the ionization potential and dissociation energy of various gas environments in which the arc is maintained. In present electric furnace practice, it is attempted to reduce the erratic and abrupt changes in voltage drop across the arc column by providing elaborate ancillary mechanical equipment responsive to the changes in voltage caused by abrupt changes in arc resistance. Changes in arc resistance are due to changes in length as the arc deviates from the shortest straight line distance between the electrode and the metal charge, changes in the ionization potential of the gas atmosphere in the furnace as the gas composition in the furnace atmosphere changes, in addition to the influence of a host of other factors such as other arcs, stray magnetic fields and air currents in the furnace. This elaborate ancillary equipment at most provides only a partial leveling of the voltage drop across the arc and power input to the furnace from the arc itself. Anyone familiar with arc furnace operation is well aware of the constant jockeying of the electrodes up and down as the voltage drop across the arc changes and as the arc actually extinguishes itself. Even with this elaborate mechanical equipment the voltage-current trace of the arc indicates extremely erratic operation. This is primarily because the elaborate mechanical means cannot respond quickly enough nor anticipate the wandering of the arc column. Consequently, high melting rates are difficult to achieve with standard open arcs because no constant high intensity heat source is available. The amount of heat energy dissipated in the arc is constantly fluctuating.

In addition since the electric arc is a non-linear resistance it must be balanced by a reactance "ballast" to prevent the current of the arc from "running away" to currents high enough to destroy the ancillary electrical equipment. Since open electric arcs are so erratic, a safety factor is built into the equipment in the form of reactance "ballast" of considerable proportions. This applies even when mechanical means for controlling arc length are utilized. Since the mechanical arc length controlling means is electrically powered and since a large safety factor on "ballast" reactance is required, any available power is not efficiently utilized; that is, the ancillary equipment itself dissipates a portion of the available power and the maximum amount of electrical energy is not available for dissipation by the arc. Power input to the furnace is not maximized for a given electrical power supply.

The inherent directional instability of an open electric arc also causes severe refractory damage which in turn contributes to melt contamination and increased heat loss from the furnace. In addition, the lateral movement of an open arc causes severe roof damage due to radiation.

In standard electric furnace practice, then, for a given power supply, the emphasis is on maintaining an open arc which is of nearly constant length by jockeying the electrodes up and down responsive to erratic changes in the position of the foot of the open arc column. By so partially achieving a less variable arc length an attempt is made to provide a less variable heat input to the furnace. The arc length in standard electric furnace practice is very short. Usually the arc length never exceeds about six inches. It is unusual to attempt to operate the extremely erratic open arc in standard furnaces at a length much longer than about six inches. As a consequence, the proportion of the total available power of the power supply that is dissipated as heat energy by the arc in relation to the electrical energy dissipated as heat energy in the ancillary equipment is low.

It is an object of the present invention to provide a novel process for heat treating conductive materials at high rates of heat input in processes wherein the heat input is fully and closely controlled by not merely preventing the arc from changing in length but by adjusting the length of arc responsive to the level of power demanded for a particular heat treating operation while simultaneously controlling the atmosphere in the furnace and the type of gas utilized as a part of the electric arc column itself.

Other objects include provision of a melting process wherein there is a maximum conversion of electrical power available from a given electrical power supply into heat energy, lower refractory damage, less melt contamination from spalled refractories, increased melting rate, lower total heat lost, operation on a 100% duty cycle, delivery of thermal energy to a desired area of the conductive material to be melted, lower radiation loss especially during meltdown and no electrode contamination.

The process achieving the aforementioned objects comprises providing a refractory receptacle containing conductive charge material within an enclosure or furnace shell providing a first electrode in contact with the conductive charge material, establishing and maintaining at least one directionally stable transferred electric arc column between a second-non-consumable electrode and the conductive material with electric current flowing between the second non-consumable electrode and the first electrode through the conductive charge material and continuing the contact until the conductive charge material is at least partially fused.

An embodiment of the proces for achieving the aforementioned objects and in addition providing a method for melting vacuum grade metals and alloys in a substantially inert atmosphere comprises providing a refractory crucible in a substantially gas tight enclosure or furnace shell containing conductive charge material, providing a first electrode in contact with the conductive charge material, initiating and maintaining, in electrical contact with a second non-consumable electrode and the conductive charge, at least one directionally stable transferred electric arc column with current flowing between the second non-consumable electrode and the first electrode through the conductive charge material, said electric arc column essentially containing at least one inert gas, continuously maintaining the directionally stable transferred electric arc column at a desired length responsive to the desired rate of heat input to the metallic charge and for a length of time sufficient to heat and fuse the metallic charge material.

The present invention utilizes directionally stable and directionally controllable transferred electric arc columns. The phrase "directionally stable" when used herein and in the claims describes an electric arc column in which the longitudinal axis or axes coincident with the flow of current remains invariant in direction or fixed in direction regardless of the surrounding environment. The phrase "directionally controllable" is used herein to describe an electric arc column wherein the longitudinal axis or axes coincident with the direction of current flow can be varied from an agle of 90° to an angle of about 15° to the surface of the conductive material to be treated without substantial curvature of the arc column. A characteristic of such directionally stable and directionally controllable electric arc columns are their amenability to being extended to relatively long lengths, as long as 48 inches and longer without being extinguished. Power dissipation in such electric arcs is virtually constant and controllable in that arc length, as a variable in determining the voltage drop across the arc, is maintained constant or it can be smoothly varied at will to meet the particular power input requirement in a given process commensurate with maximum dissipation of heat energy in the arc for a given power supply.

The electric arc columns of the present invention are also characterized by the fact that they are "transferred" electric arc columns. The term "transferred as used herein means that the electric arc column is established and maintained between a non-consumable electrode and the conductive material with current flowing between the non-consumable electrode and a second electrode in contact with the conductive material via the conductive material itself.

The electric arcs may be straight polarity or reverse polarity. That is the current may flow from the non-consumable electrode to the conductive material, i.e., straight polarity, or the current may flow from the conductive material to the non-consumable electrode, i.e., reverse polarity. Furthermore, the current may be A.C. or D.C.

Furthermore, the first electrode may be one or more directionally stable transferred electric arc columns running at the opposite polarity of the arc column or columns established and maintained between the second non-consumable electrode or electrodes and the conductive material.

The phrase "conductive materials" as used herein means any material capable of conducting electric current at least in the fused state. Conductive materials include metals, metal alloys, fused salts such as alkali and alkaline earth metal halides and slags such as metallic oxides and silicates.

The power input can be controlled and optimized to meet the requirements of a particular process, that is the melting rate may be increased as required in a particular process by increasing the voltage drop across the arc column. This is in sharp contrast to standard furnace practice wherein power input is in essence not controlled smoothly by affirmatively adjusting arc length responsive to the desired power input level but rather it is sought to suppress the erratic changes in the length of a relatively short arc. That is, for a given power supply in a standard electric arc furnace meltdown process operating with electrodes about 6 inches above the metal the erratic fluctuations in voltage and current due to erratic changes in arc length as the arc jumps to the nearest piece of scrap or is influenced by air currents, magnetic fields or contaminating metal vapors, etc. are suppressed somewhat thereby tending to level out the heat energy input possible at the short 6-inch arc length. In the present process for the same given power supply much higher melting rates are achievable since in addition to complete directional stability, the arc lengths can be adjusted to much greater length thereby effectively dissipating much more of the available electrical energy as thermal energy in the arc column within the furnace at a constant high level of heat intensity. The conductive material in the furnace is submitted to a constant, rather than erratically fluctuating level of thermal energy and heating is continuous and much faster thereby increasing melting rate and greatly decreasing the heat loss per pound of metal fused both in the ancillary reactance ballast and due to total heat leakage from the furnace during melting.

There are several methods of producing and maintaining the arcs of the present invention one of which is disclosed in U.S.P. 2,806,124 issued September 10, 1957 to R. M. Gage. U.S. application Serial No. 595,003 filed June 29, 1956, now abandoned by R. M. Gage, is a continuation-in-part of the aforementioned patent and U.S. application Serial No. 50,194 filed August 17, 1960 by R. M. Gage is a continuation-in-part of application Serial No. 595,003. The present application is a continuation-in-part of application Serial No. 50,194.

One method for establishing a directionally stabilized arc column as disclosed in the above-identified patent application Serial No. 50,194 comprises forming a quasi-electrode between a non-consumable electrode and the crucible by first striking an arc therebetween, surrounding the electrode with an annular gas stream, subsequently directing at least a portion of said gas stream by means of a cold wall nozzle into intimate contact with said arc, thereby directionally stabilizing the same, and wherein a portion of the gas stream is ionized to form an extremely stable arc path.

It has been found that the gas upon entrance into the furnace need not surround the non-consumable electrode nor that it necessarily be directed into contact with the arc column by means of a cold wall nozzle. Rather the gas stream need only be a confined flow of gas directed to contact the electric arc column near the non-consumable electrode. The flow vector of the gas must be generally in the direction of the melt itself. Although various means for producing directionally stable arcs are known, it is necessary in the present invention to produce directional stability by flowing gas in contact with the arc column, and preferably in a manner so as to shield the electrode from contaminating furnace atmosphere and metal particles and vapors. The use of a flowing stream of gas to directionally stabilize the arc column is necessary in the present invention since the flowing stream of gas performs several other important functions in addition to stabilizing the electric arc column itself. Directionally stable arcs produced by whirling gas streams about the arc column near the non-consumable electrode tip and thereafter ultimately down the arc column in the general direction of the charge to be melted may also be employed in producing the directionally stable arcs utilized in the present invention. This method of producing a directionally stable electric arc column is disclosed in U.S. Patent application Serial No. 223,484, filed September 13, 1963, by Robert J. Baird.

As previously discussed, meltdown requires as high a melting rate as possible to realize heat economy by minimizing total heat loss from the furnace per pound of metal melted. High melting rates in any given electric furnace configuration having a given atmosphere and refractories in reasonably good repair is largely determined by the rate of heat input and rate of heat transfer to the material to be melted. A constant heat input at a high heat intensity is most desirable. A heat source fluctuating in intensity such as an erratic open arc, which incidentally may extinguish itself, is in essence a heat source having many "power off" intervals and therefore requires more time to transfer the requisite amount of heat required to melt a charge. In contrast the directionally stable arc used in the present process is a constant source of heat energy at high intensity which has no "power-off" intervals. An indication of steadiness of the heat energy dissipation in the present process is readily apparent by comparison of the voltage-current traces of the directionally stable A.C. and D.C. arcs in the present process as compared with voltage current traces of a standard open A.C. arc.

FIGURE 1 clearly shows the smooth current and voltage traces of the directionally stable A.C. and D.C. arcs of the present invention as contrasted with the typical erratically fluctuating current and voltage traces of the prior art. Traces E through H of FIGURE 1 were taken with an Esterland Angus type recorder. This type of instrument, of course, is incapable of measuring very slight current and voltage changes due to the dampened response although it is considered generally to be a high speed recorder. The typical prior art arc voltage and current traces as illustrated by traces A–D are typical of those resulting from the use of any relatively high speed recorder.

Traces A, B, C and D are prior art traces taken from the Iron and Steel Engineer, June, 1957, "Experimental" by W. E. Schwabe, page 89. Traces A and B show the voltage and current surges during meltdowns experienced during a solid graphite electrode A.C. operation and traces C and D show the voltage and current surges experienced during hollow graphite electrode A.C. operation. Traces G and H are voltage and current traces, respectively which resulted during meltdown from A.C. operation of the directionally stable arcs of the present invention. Traces E and F are voltage current traces respectively which resulted during meltdown from D.C. operation of the directionally stable arcs of the present invention. The numbers on the scales of traces E and F are the actual voltages and amperes. The numbers on the scale of trace H must be multiplied by 500 to get the actual current in amperes. The numbers on the scale of trace G must be multiplied by 4 to get actual volts. For purposes of comparison, the current variance of the open arc of traces B and D is as high as 50% above and 50% below a mean value of 40,000 amperes. In sharp contrast the current variance across the directionally stable arc columns of the present invention are less than about 2% above and below the mean values.

It is readily apparent that the power input to a melt is much less variable in the present process than the melting process of the prior art wherein open arcs from either hollow or solid graphite electrodes are utilized.

In an effort to clearly show the extremely small voltage and current trace variation characteristic of the directionally stable arcs of this present invention, an extremely sensitive and essentially undampened recorder was used. The recorder consisted of a recording oscillograph which operated by impinging a light beam on photographic paper to record the voltage and current traces. This type of recorder has no friction or needle inertia or other factors which tend to dampen its response. It has the fastest response known. Voltage and current traces of the D.C. directionally stable electric arcs of the present invention were taken during meltdown. It was noted that there was no current or voltage variation evident. In fact the only variation which was evident at all was the characteristic wave shape of the current and voltage of the power supply itself. The wave shape of the incoming power supply is not altered by the behavior of the directionally stable arcs of the present invention and consequently power input to the bath is smooth and without fluctuations and "power off" periods.

For a given power supply then, melting by the present process permits more efficient utilization of the available electrical energy. Since there is substantially no erratic and uncontrolled fluctuation in the voltage across the arc, the process can be conducted at nearer the optimum power rating for the ancillary equipment. The power dissipated in the arc itself can be maximized while the power dissipated in the ancillary equipment is minimized.

In addition to the fact that meltdown in the present process is conducted by supplying a constant-heat input, the present process is highly flexible and adaptable to various modes of operation. That is, the level of power dissipated in the arc can be smoothly controlled and adjusted to meet the requirements of various situations. The voltage drop across the standard open arc in a standard furnace atmosphere (i.e. air and reaction of gases such as $CO$, $CO_2$) is erratic. The voltage drop across the directionally stable electric arcs of the present invention is a function of the type stabilizing gas, the temperature of the furnace atmosphere as well as arc length.

Various types of gases differ rather widely in their ability to dissipate electrical energy as heat energy in the directionally stable arc columns of the present invention. The energy of dissociation and the energy of ionization of a given gas are determinative of the voltage drops across a given length of arc column at a given temperature. The ionization potential in general is the energy required to transfer an electron from its normal quantum level in an atom to an infinite distance from the nucleus of the atom. The first degree of ionization for such gases as Ar, He, N and O is about 15.7, 24.5, 14.5 and 13.4 electron volts respectively. But ionization potential alone is not sufficient to account for the relative voltage drops across arc columns containing different species of gases. The energy dissipation in diatomic gases is due to the required energy of dissociation of diatomic gases such as $N_2$, $H_2$ and $O_2$. Further, it should be noted that complete dissociation does not always take place, therefore, it may be that though some gases such as $H_2$ for example have a very much lower dissociation energy than $N_2$ the voltage gradient induced by the use of $H_2$ in an arc column is considerably higher since $N_2$ does not fully dissociate whereas $H_2$ readily dissociates completely.

Figure 2:
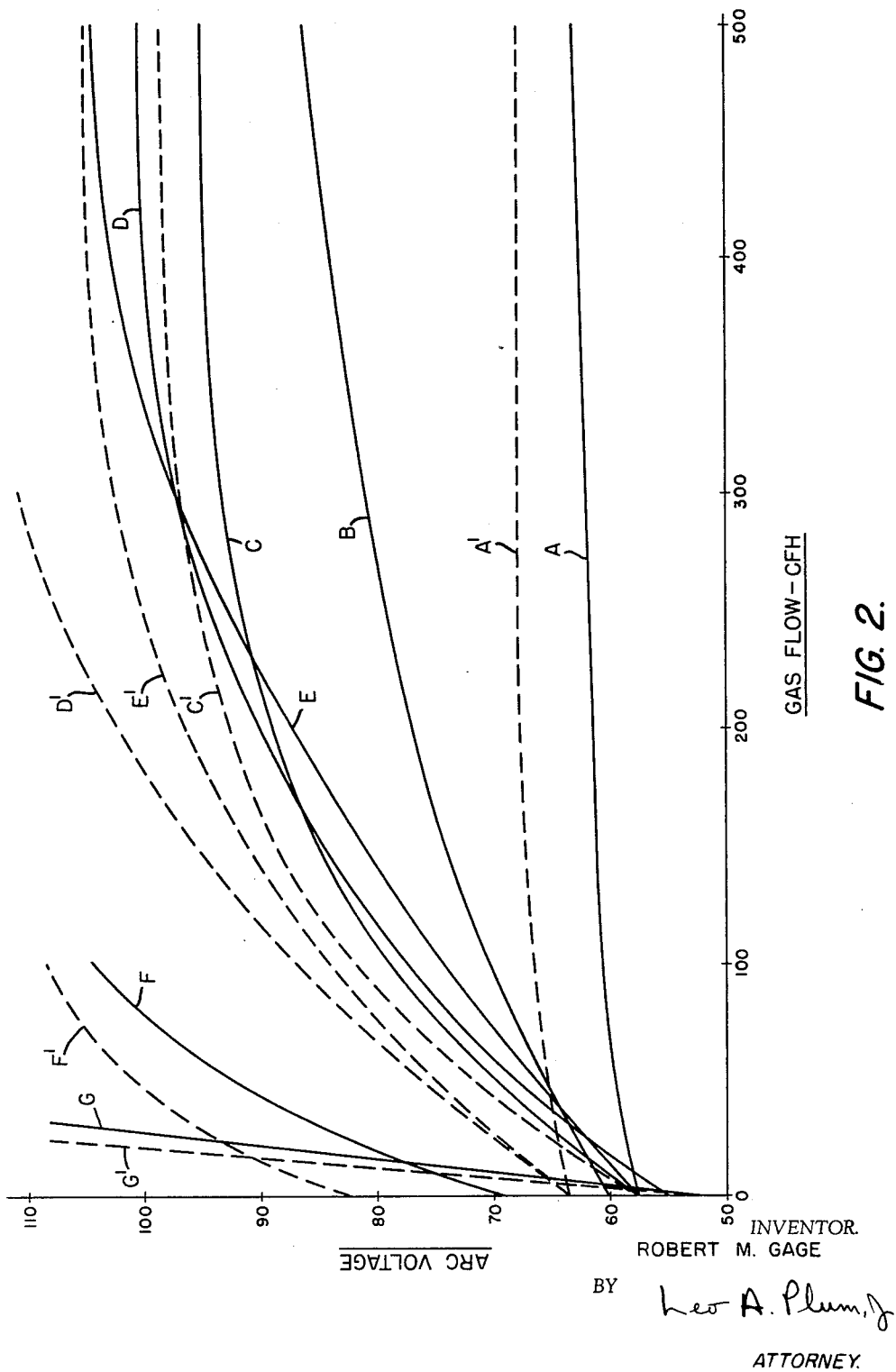

FIGURE 2 is a graphical presentation of the voltage drop across the arc column as a function of the gas flow rate in standard cubic feet per hour for various gases.

The data in FIGURE 2 was secured by taking voltage measurements across a directionally stable transferred electric arc column running at 1,000 amperes of D.C. current in a three hundred pound capacity furnace. In all instances 100 standard cubic feet per hour of argon was flowed into direct contact with the arc column near the non-consumable electrode. In addition, to prevent the furnace atmosphere from becoming contaminated with the environment and thereby disrupt and give erroneous voltage measurements 120 cubic feet per hour of argon was flowed into the furnace interior through the pouring spout of the furnace. It should be further noted that in some instances there are certain gases which cannot be flowed past a thoriated tungsten non-consumable electrode because they are reactive therewith and, therefore, these gases were simply injected into the furnace interior via the pouring spout and were incorporated into the electric arc column by virtue of the well-known "pumping" effect associated with directionally stable electric arc columns. Carbon monoxide and nitrogen as listed below were injected into the furnace atmosphere via the pouring spout and thereafter into the arc column by virtue of the pumping associated therewith. The directionally stable electric arc columns were also varied in length and the rate of flow of gas into contact with the arc column was varied to show the change in voltage drop across the arc columns as a function of these variables. The following Table I summarizes the pertinent data associated with each curve in FIGURE 2.

TABLE I

| Curve | Flow rate and type gas through arc torch (s.c.f./h.) | Flow rate type gas through pouring spout (s.c.f./h.) | Arc column length (inches) |
| --- | --- | --- | --- |
| A | Ar-varied | Ar-120 | 5.375 |
| A₁ | Ar-varied | Ar-120 | 7.125 |
| B | Ar-100 | Ar-120, He-varied | 7.125 |
| C | He-varied | Ar-120 | 5.375 |
| C₁ | He-varied | Ar-120 | 7.125 |
| D | Ar-100 | Ar-120, CO-varied | 5.375 |
| D₁ | Ar-100 | Ar-120, CO-varied | 7.125 |
| E | Ar-100 | Ar-120, N₂-varied | 5.375 |
| E₁ | Ar-100 | Ar-120, N₂-varied | 7.125 |
| F | Ar-100 | Ar-120, H₂-varied | 5.375 |
| F₁ | Ar-100 | Ar-120, H₂-varied | 7.125 |
| G | Ar-100, H₂-varied | Ar-120 | 5.375 |
| G₁ | Ar-100, H₂-varied | Ar-120 | 7.125 |

In general it is contemplated that nitrogen, oxygen, methane, hydrogen, carbon monoxide, carbon dioxide, argon, neon, helium, xenon and krypton or any combination thereof may be used in the directionally stable electric arc column.

It has also been found that as the temperature of the furnace atmosphere increases there is a tendency for the voltage drop across the arc to decrease. Since the temperature of the furnace atmosphere cannot be practically controlled, the gas atmosphere in contact with the electric arc becomes the major controlling variable in determining the amount of heat dissipated in the arc column in a directionally stable arc at a given length for a given power supply, and available for use in the meltdown process.

The stabilizing gas in addition to functioning as a method of control of the voltage drop across the arc also in essence carries the major part of the current in the electric arc column.

Meltdown by the present process is also conducted in a manner heretofore unknown to prior art electric furnacing operation. The standard open arc emanating from electrodes as large as four feet in diameter is constantly traversing the electrode tip and flaring out from the periphery of the electrode. In fact, in standard three-phase operation with three electrodes, the arcs methodically and uncontrollably pulsate from center of the furnace to the outer walls of the furnace. This phenomenon, known as arc flare, subjects the side walls and roof of the furnace to severe temperature stress due to the highly irradiating character of the arc and as a pool of molten metal forms under the electrode the bath itself loses major amounts of heat by radiation to the surrounding refractories. In addition, due to violent explosions in the newly forming melt caused by drastic expansion of gases, the furnace atmosphere fills with metal vapor and smoke. The present meltdown process is characterized by the arc boring a relatively small hole or cylinder down through the solid metal charge. A molten pool of metal is then formed under an overburden of charge metal and any heat loss by irradiation from the newly forming molten pool is captured by the overburden of metal and accordingly is utilized to melt charge material and not to damage refractories. Any explosions in the melt are confined to an area under the overburden and metal vapor contamination and "smoking" is virtually eliminated. In addition, because the metal on fusion expands, the molten pool is continuously contacting the overburden of non-fused metal greatly aiding in the transfer of heat thereto by conduction.

Since the electric arcs utilized in the present process are directionally controllable in addition to being directionally stable, they can be directed to transfer heat energy to a predetermined and desired portion of the charge material. The hole or cylinder originally bored into the charge material can be readily enlarged by merely directing the arc in an expanding circular movement or selected portions of the charge can be fused as desired.

The electric arc column used in the present invention has considerable momentum and in itself provides some stirring action upon impinging on the molten pool of metal.

Moreover, in the present process the arc column does not have to be operated in a substantially vertical position with respect to the melt. The stable arc used in the present invention has been operated during metal meltdown at angles up to 70° from the vertical and the arc column remained in substantial alignment with the non-consumable electrode. That is, at the point of impingement the column remained at essentially 70° from the vertical. It is this exceptional directional stability of the arc column of the instant application which, as opposed to prior art apparatus, allows controlled angular impingement of the arc column on the metal charge.

Basic studies of the characteristics of the arc column have indicated that for a successful operation of the present process the atmosphere in the furnace must be maintained at an absolute pressure of at least about $\frac{1}{20}$ of an atmosphere.

The utility and importance of the present invention can be demonstrated with particular reference to melting metals and alloys such as iron, steel, titanium, nickel and the like. The present process can be operated for metal melting purposes in skull-type furnaces, water-cooled crucible-type furnaces, refractory furnaces, and the like. Furthermore, any suitable A.C. or D.C. power supply capable of supplying adequate power to the apparatus can be used. In general, the processes of this invention can be applied to a particular metal or group of metals in any of a variety of furnace shapes and sizes with changes in emphasis obvious to one skilled in the art.

The following examples illustrate various aspects of the present invention.

*Example 1*

The torch apparatus consisting of a ½-inch diameter thoriated tungsten electrode positioned with a ¾-inch diameter water-cooled copper nozzle. The tip of the electrode was recessed ⅛ inch from the nozzle outlet. Argon gas at 180–190 s.c.f./hr. passed around the torch electrode and out through the nozzle. A pilot arc of 175 amperes and 18 volts was continuously maintained between the torch electrode operating as cathode and the nozzle. This torch was mounted in the cover of a metal melting furnace and extended into the melting crucible, the contents of which constituted the anode. The crucible was 5 feet in diameter and about 5 feet deep with a 1-foot refractory lining. It contained 1,000 lbs. of scrap steel, 70 lbs. of pig iron, and 50 lbs. of ingot iron for a 1120-lb. total charge. Electrical connection to the metal charge was maintained through three 2-inch diameter ingot iron rods which formed the bottom connection. An arc of 990 amperes D.C. and 160 volts was initiated between the cathode and the metal charge. About 45 minutes later, the arc power was increased to 2000 amperes and 177 volts. Ten minutes later, the power was increased to 2460–2500 amperes direct current and 165 volts. After about 2 hours, the metal charge was totally molten. The arc lengths were estimated to be between about 1 foot and about 2½ feet during meltdown. The run was continued for about an hour during which time the arc was periodically extinguished to take temperature readings of the bath and then reignited. At the end of this time the arc was extinguished and the molten charge was poured from the furnace. Examination of the electrode and nozzle indicated negligible damage of erosion. This particular example was the fifteenth test in this furnace using the same electrode and the same furnace lining.

This example illustrates the use of the apparatus of the present invention in a one-ton furnace at varying arc lengths and power inputs. Moreover, the compatibility of the use of the arc torch apparatus of this invention with standard furnace linings is demonstrated.

*Example 2*

A torch apparatus consisting of a ¼-inch diameter tungsten electrode containing 2 percent thoria was mounted flush with the outlet of a 5/16-inch I.D. water-cooled copper nozzle. This apparatus was mounted with a 12-inch I.D. furnace 8 inches deep having a 2½ inch thick refractory lining on the walls and a 4-inch thick lining on the bottom. The furnace contained about 50 lbs. of ARMCO ingot iron punchings. Argon gas at 34 s.c.f./hr. was passed around the electrode and through the nozzle. An arc of about 25–50 volts and 600 amperes D.C. was initiated by touching the torch electrode operating as the cathode to the punchings operating as the anode and then withdrawing it to a distance of about ½ inch. Standard electrical connections were used. As the metal melted, the arc length gradually increased to about 2½ inches. No adjustment of the torch was necessary during the run. After 8 minutes, 31 s.c.f./hr. hydrogen was added to the argon stream and the voltage raised to 80–110 volts. This essentially doubled the power input. Temperature measurements taken with an immersion thermocouple indicated that the charge was completely molten after about 30 minutes. The arc was then maintained for about 15 minutes more at which time the melt was poured. The arc was intentionally extinguished just prior to pouring. The total energy required for melting was about the same as that of existing processes used with 50-lb. furnaces.

This particular example illustrates the use of the apparatus of the invention for metal melting in a 50-lb. capacity furnace. Specifically shown in the use of a flush-mounted torch electrode, stability of the arc without electrode-to-charge distance adjustment, the use of a mixture of argon and hydrogen as the gas, and the possibility of increasing the power input at the same current level by the addition of a diatomic gas.

*Example 3*

A one-ton arc furnace was equipped with standard electrical connections and with a torch apparatus comprising a ½-inch diameter thoriated tungsten electrode positioned with a ¾-inch I.D. water-cooled copper nozzle coated with a refractory. The tip of the electrode was recessed ⅛ inch from the nozzle outlet. The furnace was charged with 1000 lbs. of scrap, 145 lbs. of ingot iron, and 48 lbs. of pig iron. The arc was operated at 150 volts and 900 amperes direct current, with the torch electrode functioning as cathode and the metal charge as anode. Over a period of about one hour the voltage was increased to 170 volts and the current to 2400 amperes. While in the furnace, the steel was very quiet and no bubbling was observed. The ingots were gas-free. The total meltdown time was about 101 minutes. Thirty-three percent meltdown efficiency, starting with a cold furnace, was obtained in this run.

This particular example is the sixteenth run in the one-ton furnace employing the same electrode and the same furnace lining. This example illustrates the use of the apparatus of this invention for metal melting in a one-ton furnace. Specifically demonstrated is direct-current, straight-polarity operation at current levels up to 2400 amperes and argon flow rates up to 350 standard cubic feet per hour, the gas velocity past the torch electrode being from about 37 to about 52 feet per second.

*Example 4*

A 50-lb. capacity furnace was equipped with standard electrical connections and an arc torch comprising a ⅜-inch diameter nozzle and ¼-inch diameter thoriated tungsten electrode operated on direct current with the torch electrode as the cathode. The furnace was charged with 50 lb. of ARMCO ingot iron. Several runs were made at varying argon flow rates. The experimental results are compiled below in Table 2.

TABLE 2

| Gas comp. | Gas flow, s.c.f./hr. | Volts | Amps., D.C. | Arc diameter (inches—meas. 1" from nozzle) |
|---|---|---|---|---|
| 100% A | 100 | 44 | 410 | .58 |
| 100% A | 50 | 42 | 410 | .63 |
| 100% A | 25 | 43 | 410 | .79 |
| None | 0 | 75 | 370 | .92 |
| 100% A | 13 | 43 | 410 | .83 |
| 100% A | 150 | 48 | 400 | .58 |
| 100% A | 200 | 50 | 400 | .54 |

This example illustrates the present melting process at various argon flow rates.

*Example 5*

A torch apparatus comprising a ¼-inch thoriated tungsten electrode positioned within a 5/16-inch water-cooled copper nozzle was successfully operated in a 50-lb. metal melting furnace at a 45° angle. A directionally stable, smooth arc torch column was maintained at normal operating gas flows of between 75 and 150 standard cubic feet of argon per hour. Maximum current input for this run was 580 amperes direct current with the torch electrode operating as cathode.

This example demonstrates the directionally stable operation of the apparatus when the arc torch is inclined at a 45° angle.

*Example 6*

A torch apparatus comprising a ¾-inch water-cooled copper electrode positioned within a ⅝-inch water-cooled copper nozzle and recessed about ¼ inch inside the nozzle was operated in a 50-lb. capacity furnace equipped with standard electrical connections and charged with 50 lbs. of ingot iron. The torch was operated at 50 volts and 500 amperes direct current with the torch electrode operating as anode. The gas flow was 150 standard cubic feet of argon per hour. Meltdown time was about one hour. After the furnace charge was molten, nitrogen gas was introduced along with argon, this mixture constituting the gas flow. The gas flow was reduced to 100 s.c.f./hr. with the gas composition being 16.6 percent nitrogen with the balance argon. Then the nitrogen flow was shut off, carbon monoxide was mixed with argon and passed through the arc torch. The mixture consisted of 26.1 s.c.f./hr. of CO and 80 s.c.f./hr. of argon. The torch-furnace combination performed satisfactorily throughout the experiment.

This example specifically illustrates the use of a reversed-polarity arc column for metal melting and also the use of argon-nitrogen and argon-carbon monoxide mixtures in the arc column.

*Example 7*

A torch apparatus comprising a 1-inch diameter thoriated tungsten electrode (1 percent thoria) positioned and recessed within a water-cooled copper nozzle was operated in a one-ton metal melting furnace equipped with standard A.C. electrical connections and charged with 270 lbs. of scrap, 350 lbs. of ingots, and 15 lbs. of ingot iron. The gas flow was about 450 standard cubic feet of argon per hour. A direct-current pilot arc was operated at 35 volts and 104 amperes. The main arc was operated at 150 Root Mean Square volts and about 1200 to 1700 Root Mean Square amperes. During the operation arc lengths of about 2½ feet were achieved.

This example illustrates the operation of the apparatus of this invention with alternating-current power input. Moreover, this example demonstrates the achievement of long arc lengths with a directionally stable A.C. arc column.

*Example 8*

A torch apparatus to that of FIGURE 10 and comprising a ¼-inch thoriated tungsten electrode positioned within a 5/16-inch water-cooled copper nozzle was used to melt 13 lbs. of titanium buttons in a 15-lb. capacity water-cooled crucible metal melting furnace equipped with standard electrical connections. The torch was operated on direct current with the torch electrode operating as cathode. The gas passed through the torch was argon.

This example illustrates the meltdown of a non-ferrous metal by water-cooled crucible methods.

*Example 9*

A 50-lb. furnace was equipped with standard electrical connections and a torch apparatus. The torch apparatus comprised a ¼-inch thoriated tungsten electrode positioned within a 5/16-inch inside diameter water-cooled nozzle. Four 1/16-inch diameter drilled holes were provided for the introduction of a reactive gas into the arc column below the torch electrode. Operating a 500 amperes straight-polarity direct current and 47 volts with 100 standard cubic feet of pure argon flowing through the nozzle, the torch melted 50 lbs. of ingot iron. Following the completing of the meltdown, CO was injected into the arc column at 12 standard cubic feet per hour. In a series of six steps, the CO flow was increased to 120 standard cubic feet per hour. Maximum arc voltage attained during the injection of CO was 70 volts. After a fifteen-minute injection period, the CO was turned off and the metal poured. This example illustrates the use of a reactive gas in the present invention.

Since the arc column itself provides a "pumping effect" by circulating the furnace atmosphere in a rolling motion down the arc column and out along the surface of the metal charge, the surface of the charge is constantly being exposed to a flush by the furnace atmosphere. This later aspect is of great importance when the present process is conducted under virtually complete inert atmospheric conditions for which it is well suited.

As previously discussed, the flowing stabilizing gas has various functions in the present process. It provides a stirring effect due to its momentum, it carries a large portion of the arc current, it is adjusted in composition to control voltage drop across the arc column as a means of controlling and maximizing the amount of available electrical energy dissipated as heat energy in the furnace for use in heat treating the charge, and very importantly the flowing stabilizing gas is advantageously used to adjust and maintain the desired atmosphere in the furnace itself.

One of the prime advantages realized by artisan employing the present melting process is the ability to use inert gases both as a means of transferring heat to the bath at various power inputs dependent upon the type and flow rate of the gas flowed into contact with the arc column and in addition the ability to use the same inert gas to establish a substantially non-contaminating inert gas within the furnace interior during meltdown. For example, during approximately forty meltdowns in a relatively leak-proof three hundred pound furnace utilizing the present process with argon analyzing 0.5 to 1.5 p.p.m. oxygen, 1 to 5 p.p.m. nitrogen and less than 1 p.p.m. methane, flowing into contact with the electric arc column, the average furnace atmosphere composition as determined by a standard gas chromatograph is shown in Table 3 below.

TABLE 3

| | |
|---|---|
| Oxygen | not detectable by chromatographic analysis. |
| Nitrogen | ~500 p.p.m. |
| Methane | not detectable by chromatographic analysis. |
| Hydrogen | ~1500 p.p.m. |

Figure 3:
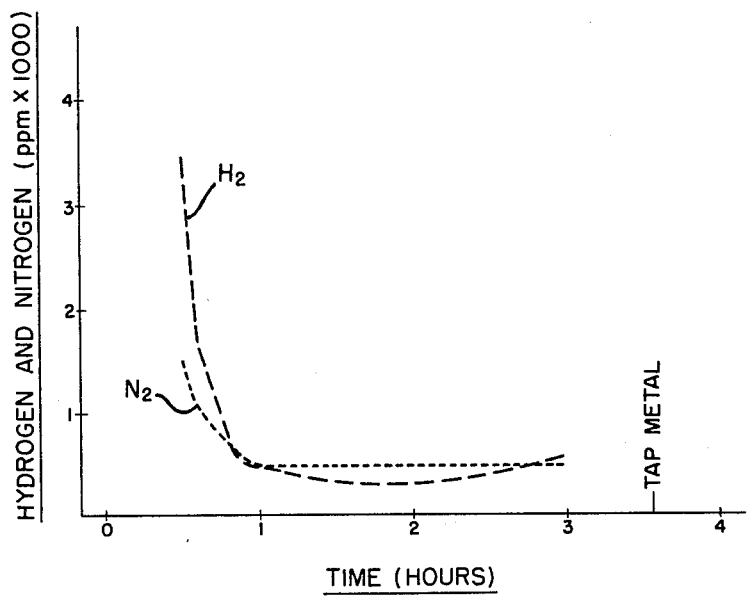

In addition, FIGURE 3 illustrates the purging of the contaminating atmosphere and maintenance of a non-contaminating furnace atmosphere during a typical run conducted as specified in securing the data for Table 3.

Of prime importance in any melting process is the ability to continuously and consistently produce "quality" metal, that is, metal which will consistently meet rigid specifications. Melting of AISI 4340 was selected as illustrative of the ability of the present process to produce "quality" metal consistently. In this instance vacuum grade metal was produced without expensive vacuum equipment and time consuming evacuation operations.

The data presented hereinafter was secured from approximately 15 different meltdowns in a three hundred pound capacity furnace by the process of the present invention employing a 1500 ampere D.C. arc column directionally stabilized by an argon gas stream flowing into contact with the arc column at a flow rate of about 100 s.c.f./hr. The furnace was relatively leakproof. The top of the furnace was fitted to the furnace shell by a sand seal.

A water-cooled stirring coil was positioned in the furnace refractory on each side of the furnace. The return current from the bottom furnace electrode flowed in parallel through the coils. Current through the coils produced a magnetic field in the hearth of metal bath area. The flow of current in the arc plasma through the metal bath to the bottom electrode passed at right angles to the field of the coils and resulted in a magnetic stirring action. This latter stirring apparatus and its operation are disclosed and claimed as a separate invention in U.S. patent application Serial No. 225,794, filed on even date herewith by R. C. Myers et al. This stirring apparatus was used primarily to achieve meltdown in a minimum of time. While the stirring mechanism may aid somewhat in achieving quality metal, melting with the process of the present invention per se is primarily responsible for the quality metal produced herein.

The charge material consisted of electrolytic iron, graphite, low carbon ferromanganese, ferrosilicon, electrolytic nickel, low carbon ferrochrome and ferromolybdenum. These materials were chosen because of their low level of such undesirable elements as sulfur and phosphorus and because their use allows a reasonable estimate of the recoveries. For test purposes all of the charge is added before the arc is struck. There are no late additions after melting was initiated.

The atmosphere in the furnace was primarily argon. Argon entered the furnace through the torch apparatus as part of the arc column, through a sight port in the roof and through a sight port at the pouring spout. Argon left the furnace through the roof sand-seal as well as minor leaks in the roof and furnace shells.

Furnace atmosphere was sampled continuously through a tube in the furnace roof. The sample gas was analyzed at regular intervals by a Beckman gas chromatograph Model GC-1 or GC-2 a typical calibration for which is: hydrogen—6 p.p.m. per scale division, oxygen—80 p.p.m./scale division, nitrogen—80 p.p.m./scale division and carbon monoxide—105 p.p.m./scale division.

The furnace tilted about its pouring spout for tapping. The metal was tapped into a high alumina cast refractory tundish. Metal flowed from the tundish down into an ingot mold—usually a 4" x 4" x 23" 100 lb. cast iron mold. The tapping stream was protected by argon flowing continuously through a metal shroud which covered the tundish during pouring. The teeming stream from the tundish was also protected by argon flowing through a standard teem-stream protector mounted below the tundish. The ingot mold was argon purged during casting.

Metal was checked for hydrogen, oxygen and nitrogen content. When possible, metal was sampled shortly before tap using a Taylor sampler. Taylor samples were refrigerated in liquid nitrogen to preserve the dissolved hydrogen and were analyzed by micro vacuum fusion. In addition, nitrogen analysis by the Kjeldahl method was performed.

The as-cast ingots were given a heat treatment before testing. The treatment was patterned after known procedures and consisted of:

Heat treatment of ingot:     Purpose
(1) 13 hours at 1975° F.
    air cool _____ Homogenization.
(2) 13 hours at 1750° F.
    air cool _____ Homogenization, carbide solution, and grain refinement.
(3) 13 hours at 1200° F.
    furnace cool _____ Tempering for test specimen machining.

The specimens taken from the ingot were also treated as follows prior to tensile and Charpy testing.

Heat treatment of specimens:     Purpose
(1) One hour at 1600° F.,
    cool to 1400° F.
(2) One hour at 1400° F.,
    oil quench _____ Austenitize followed by quench to martensite.
(3) One hour at 400° F.,
    water quench _____ Temper.
(4) One hour at 400° F.,
    water quench _____ Retemper to minimize retained austenite.

This heat treatment results in a strength level of from 270,000 to 284,000 p.s.i.

The standard tensile properties-ultimate tensile strength, yield strength, elongation, and reduction of area were determined on standard threaded .505 or .357 tensile specimens. After tensile testing, hardness measurements were also taken.

The impact strength was taken at −40° F. using standard charpy specimens. Hardness readings were taken on the broken charpy bars to assure that the strength level was equivalent to that in the tensile specimens. (Hardness varies directly with tensile strength).

The following Table 4 lists the air and vacuum melt specifications for AISI 4340:

TABLE 4

METAL COMPOSITION

| Type melt | Fe | C | Si | Ni | Mo | Cr | Mn | S | P |
|---|---|---|---|---|---|---|---|---|---|
| Air | Balance | 0.38–0.43 | 0.06–0.35 | 1.65–2.0 | 0.20–0.30 | 0.70–0.90 | 0.65–0.85 | 0.025 Max | 0.025 Max |
| Vacuum | Balance | 0.40 | 0.26 | 1.95 | 0.25 | 1.24 | 0.85 | 0.017 | 0.011 |

TYPICAL PHYSICAL SPECIFICATIONS

| | Yield, p.s.i., 1% offset | Yield, p.s.i., 0.2% offset | Ultimate tensile strength, p.s.i. | Percent elongation | Charpy, 40° F. |
|---|---|---|---|---|---|
| Vacuum | 225,000 | 236,000 | 282,500 | 7.0 | 10.5 |
| Air | 213,000 | 227,000 | 275,000 | 8.5 | 9.0 |

It was found that the present process was capable of producing AISI 4340 alloy from the charge materials of a composition which fell consistenly into the vacuum melt specifications for the metal composition. Of course, this fact in itself is not fully determinative of a commercial process. This is so since it is possible to determine, after many melt-downs in a particular process, the excess amount of starting metals necessary to recover an alloy meeting the metal composition of a final tapped alloy: the true test of an efficient process is the extent of recovery of the initial starting elements in the charge after tapping. The following Table 5 shows the average recovery from a number of heats of various alloying elements after meltdown and casting.

TABLE 5

| Element | Percent Recovered | Limits of Analytical Accuracy |
|---|---|---|
| Carbon | 86 | ±2.5 |
| Chromium | 100 | ±2 |
| Nickel | 100 | ±1.5 |
| Silicon | 100 | ±4 |
| Molybdenum | 100 | ±10.7 |
| Manganese | 96 | ±1.2 |

The carbon charged in this series of heats was utilized as an alloying agent as well as a deoxidizing agent. Thus the carbon was oxidized to gaseous carbon monoxide and discharged from the furnace in the effluent gas and some loss of carbon was expected. Sources of oxygen for this oxidation mechanism are attributed to oxygen in the charge material (about 175 p.p.m. oxygen) and furnace refractories and moisture.

Deserving of special note is the manganese recovery (manganese has a vapor pressure of approximately 25 mm. Hg at steel-making temperatures). In spite of the disadvantage of addition with the initial charge and the resultant opportunity for volatilization during the entire heat time, a recovery of 96 percent was obtained in the present melting process. Recovery of such volatile elements is poor in vacuum processing. It has been reported that about 70 percent recovery of manganese is achieved during consumable electrode remelting of AISI 4340. In vacuum induction melting the vacuum must be broken at the end of the heat by the addition of an inert gas before volatile elements such as manganese can be added; if this procedure is not followed manganese is rapidly vaporized from the melt and deposits on cold portions of the vacuum system. Recovery rates of the other alloying elements show no substantial variations from vacuum practice.

In addition to the elemental content of the cast alloy, it is important, in producing quality metal, that the physical properties as well as elemental content meet a high standard. Tables 6, 7, and 8 are a summary of the Charpy Impact Values, percent-reduction in area, and percent-elongation ranges given as a function of frequency.

TABLE 6

Charpy impact ft.-lb. at 40° F.:   Frequency
- 8–9 ........................................... 2
- 10–11 ......................................... 6
- 12–13 ......................................... 15
- 14–15 ......................................... 6
- 16–17 ......................................... 3

TABLE 7

Percent reduction in area:   Frequency
- 16–18 ......................................... 1
- 19–21 ......................................... 2
- 22–24 ......................................... 1
- 25–27 ......................................... 13
- 28–30 ......................................... 11
- 31–33 ......................................... 7
- 34–36 ......................................... 2
- 37–39 ......................................... 1

TABLE 8

Percent elongation:   Frequency
- Less than 9 ................................. 1
- 9–10 .......................................... 27
- 11–12 ......................................... 7
- 13–14 ......................................... 1

A portion of the chemical composition of the metal is its oxygen, hydrogen, and nitrogen content, but by custom, these three components are not normally considered as a portion of melt chemistry and are discussed individually. The specific effect of varying quantities of dissolved gases on physical properties of a metal are not clearly known but it is generally throught that the less dissolved gas present in the metal the better the metal quality. Oxygen is present in solid steel mainly as oxides of the various metallic components, and these oxides may often be seen under a microscope as inclusions. Nitrogen may be either dissolved or present as nitrides, simple or complex, and the nitrides generally act similarly to oxide inclusions. Inclusions may also be composed of sulphur compounds, entrapped slag, and entrapped refractory from furnace and ladle linings. In rolled product the inclusions are elongated in the direction of rolling, contributing to a difference in properties parallel to and perpendicular to the rolling direction. Inclusions represent discontinuities in the parent metal, act as localized stress raisers and contribute to lower physical strength of the parent metal. Metallographic examination of the AISI 4340 melted by the present process illustrates a low inclusion content which compares favorably with vacuum melted material.

Hydrogen dissolves in steel as individual atoms and does not form inclusions as oxygen and nitrogen do. Although it has long been recognized that undesirable flaking, embrittlement, and aging are associated with the metal hydrogen-content, exact mechanisms by which hydrogen produces these adverse effects have yet to be firmly established. In general metals while in the liquid state will dissolve higher volumes of gases than they are capable of dissolving in the solid state. Thus liquid metal with a sufficiently high gas content will upon cooling reject gas from the solid to the liquid phase. If cooling is sufficiently rapid, gas bubbles will be physically entrapped in the metal, resulting in a porous structure.

Table 9 gives hydrogen contents of the final ingot and of modified Taylor samples of the metal bath shortly before tap. The hydrogen contents of AISI 4340 in p.p.m. calculated to have been in equilibrium with the furnace atmosphere shortly before tap are also listed.

TABLE 9

| Calculated equilibrium hydrogen content | Actual Taylor sample hydrogen content | Actual ingot hydrogen content |
|---|---|---|
| 1.4 | ---------- | 2 |
| 0.7 | ---------- | 1 |
| 1.4 | 1–2 | 1 |
| 1.6 | 1–2 | 1 |
| 0.8 | 1–2 | 1 |
| 1.2 | 2 | 1 |
| 0.8 | 1 | 1 |
| 0.4 | 1.6–2.6 | 1 |
| 0.9 | 2.4 | 0.9 |
| 0.5 | 1.8 | 0.6 |

It is important to note that the charge material contained approximately 8 p.p.m. hydrogen and therefore the low hydrogen content of the product represents a significant hydrogen removal.

Table 10 gives the nitrogen content in p.p.m. of the final ingot and of modified Taylor samples of the metal bath shortly before tap. The nitrogen contents in p.p.m. of the AISI 4340 calculated to have been in equilibrium with the furnace atmosphere shortly before tap are also listed. The charge material contained approximately 33 p.p.m. of $N_2$.

TABLE 10

| Calculated equilibrium nitrogen content | Actual Taylor sample nitrogen content | Actual ingot nitrogen content |
|---|---|---|
| 15 | ---------- | 12–20 |
| 10 | ---------- | 18 |
| 7 | 10–14 | 12–17 |
| 8 | 10–32 | 16 |
| 15 | 25–35 | 27 |
| 11 | 13–14 | 14–18 |
| 4 | 29 | 13–31 |
| 10 | 35 | 16–65 |
| 13 | 20–23 | 25–29 |
| 28 | 30 | 44 |
| 17 | 19 | 31 |

Tables 11 and 12 are also tables summarizing the range of oxygen and nitrogen in the cast alloys given as a function of frequency.

TABLE 11

Oxygen content, p.p.m.:   Frequency
- 6–10 .......................................... 1
- 11–15 ......................................... 4
- 16–20 ......................................... 6
- 21–25 ......................................... 2
- 26–30 ......................................... 1
- 31–35 ......................................... 1

TABLE 12

Nitrogen content, p.p.m.:   Frequency
- 11–15 ......................................... 2
- 16–20 ......................................... 6
- 21–25 ......................................... 2
- 26–30 ......................................... 3
- 31–35 ......................................... 2
- 36–40 ......................................... 1

In general it was found that the dissolved gas content of the cast alloy was as listed in Table 13 below.

TABLE 13 p.p.m.
- Oxygen ........................................ 8 to 25
- Hydrogen ...................................... 1 to 2
- Nitrogen ...................................... 10 to 30

It is readily apparent from the foregoing disclosure that the present invention is a vastly superior process for furnacing conductive materials. The present process achieves better utilization of an available power supply, operation at close to 100% of the voltage capabilities of the ancillary equipment and close to 100% of the duty cycle, delivery of heat energy to a desired portion of the conductive material, higher heat input to the charge material at lower current, reduced refractory consumption, higher melting rates, less furnace heat loss per pound of charge melted, complete and smooth control of the power dissipated as heat in the furnace proper, less "smoking" and much less bath contamination. The present process is capable of consistently producing vacuum grade metal without experiencing many of the shortcomings of vacuum melting.

While the foregoing disclosure describes the present process with some degree of particularity it is contemplated that minor modifications may be made without departing from the spirit and scope of the present invention.

What I claim is:

1. In a process for melting conductive charge materials in a refractory hearth enclosed in a furnace wherein a first electrode contacts the conductive charge material the improvement comprising establishing and maintaining at least one directionally stable transferred electric arc column between said conductive charge material and a second non-consumable electrode with the current in said arc column flowing between said first and said second non-consumable electrode through said conductive charge material and continuing said contact until said conductive material is at least partially fused.

2. A process in accordance with claim 1 wherein said conductive charge material acts as an anode and said non-consumable electrode is the cathode.

3. A process in accordance with claim 1 wherein said conductive charge material acts as a cathode and said non-consumable electrode is an anode.

4. A process in accordance with claim 1 wherein said electric arc column is an A.C. electric arc column.

5. A process in accordance with claim 1 wherein said arc column is a D.C. electric arc column.

6. A process in accordance with claim 1 wherein said conductive material is metallic.

7. A process in accordance with claim 1 wherein the first electrode is at least one directionally stable transferred electric arc column running at a polarity opposite to said directionally stable transferred electric arc column established between said second non-consumable electrode and said conductive charge material.

8. A process for melting and treating metallic charge materials comprising providing a refractory hearth within a furnace enclosure containing metallic charge material, providing a first electrode in contact with the metallic charge material, establishing and maintaining at least one directionally stable transferred electric arc column between a second non-consumable electrode and the metallic charge, varying the power input into said furnace enclosure by controllably adjusting the length of said directionally stable electric arc column commensurate with the desired heat input in said furnace and continuing said contact until said metallic charge material is at least partially fused.

9. A process in accordance with claim 8 wherein said metallic charge material acts as an anode and said non-consumable electrode is the cathode.

10. A process in accordance with claim 8 wherein said metallic charge material acts as a cathode and said non-consumable electrode is an anode.

11. A process in accordance with claim 8 wherein said electric arc column is an A.C. electric arc column.

12. A process in accordance with claim 8 wherein said electric arc column is a D.C. electric arc column.

13. A process in accordance with claim 8 wherein the first electrode is at least one directionally stable transferred electric arc column running at a polarity opposite to said directionally stable transferred electric arc column established between said second non-consumable electrode and said metallic charge material.

14. A process for melting and treating metallic charge materials comprising providing a refractory hearth within a furnace enclosure containing metallic charge material, providing a first electrode in contact with the metallic charge material, establishing and maintaining at least one directionally stable transferred electric arc column between a second non-consumable electrode and the metallic charge material, said directionally stable transferred electric arc column containing flowing gas which is at least partially dissociated, varying the power input into said furnace enclosure by varying the species of partially dissociated gas in said arc column, and continuing said contact until said metallic charge material is at least partially fused.

15. A process in accordance with claim 14 wherein the gas in said electric arc column is at least one selected from the group consisting of argon, neon, helium, krypton, xenon, oxygen, nitrogen, carbon dioxide, carbon monoxide, hydrogen and methane.

16. An improved process for melting and treating metallic charge materials under non-contaminating conditions comprising providing a refractory hearth within a furnace enclosure containing metallic charge materials therein, said furnace enclosure being substantially leak-proof with respect to gases, providing a first electrode in contact with the metallic charge material, establishing and maintaining at least one directionally stable transferred electric arc column within said furnace enclosure between a second non-consumable electrode and said metallic charge material, said directionally stable transferred electric arc column containing at least one flowing inert gas selected from the group consisting of argon, helium, xenon, neon and krypton, continuing said contact between said directionally stable electric arc column and said metallic charge material until said furnace atmosphere is substantially of the composition of said selected inert gas and said metallic charge material is at least partially fused.

17. A process in accordance with claim 16 wherein the power input to said furnace enclosure during fusion of said metallic charge is varied by controllably adjusting the length of said directionally stable transferred electric arc column commensurate with the heat input desired in said furnace.

18. A process in accordance with claim 16 wherein the power input to said furnace enclosure during fusion of said metallic charge is varied by adjusting the amount of said selected inert gas in said directionally stable transferred electric arc column.

19. A method for metal melting in a suitable crucible which comprises forming a semi-rigid quasi-electrode between a non-consumable electrode and a metal charge in the crucible by first striking a high power arc therebetween, surrounding the non-consumable electrode with a gas stream, directing said gas stream into at least partial contact with said arc, passing said gas through a fluid-cooled nozzle the walls of which are sufficiently proximate to said arc to thereby directionally stabilize same and wherein said portion of said gas stream is heated and ionized by said arc to form together with the arc said semi-rigid quasi-electrode, controlling the length of said arc to thereby control the power input to the metal charge to thereby provide a versatile method of metal melting.

20. The method of melting a substance in an arc furnace having a crucible and a non-consumable electrode which comprises establishing a quasi-electrode between the electrode and the substance in the crucible by striking a high pressure, high power arc therebetween and surrounding the electrode with an annular gas stream having a velocity of at least 5 feet per second and then directing said gas stream into intimate contact with said high pressure arc, passing said gas through a water-cooled nozzle the walls of which are sufficiently proximate to said arc to form a highly conductive directionally stabilized arc path having substantial momentum, and controlling the length of said arc to thereby control the power input to the metal charge to provide a versatile method of metal melting.

References Cited in the file of this patent

UNITED STATES PATENTS

| | | |
|---|---|---|
| 1,002,721 | Mathers | Sept. 5, 1911 |
| 2,167,575 | Kelly | July 25, 1939 |
| 2,516,016 | Pakala | July 18, 1950 |
| 2,587,331 | Jordan | Feb. 26, 1952 |
| 2,768,279 | Rava | Oct. 23, 1956 |
| 2,806,124 | Gage | Sept. 10, 1957 |